US012798127B2

(12) United States Patent
Besnard et al.

(10) Patent No.: US 12,798,127 B2

(45) Date of Patent: Nov. 17, 2026

(54) TELESCOPIC DEVICE FOR A REMOTE-OPERATION MOTORIZED ARM, AND ARM COMPRISING SAME

(71) Applicant: SOLETANCHE FREYSSINET, Rueil Malmaison (FR)

(72) Inventors: Christophe Besnard, La Glacerie (FR); Samuel Courteille, Venejean (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 0 days.

(21) Appl. No.: 19/252,296

(22) Filed: Jun. 27, 2025

(65) Prior Publication Data

US 2026/0001241 A1 Jan. 1, 2026

(51) Int. Cl.
*B25J 18/02* (2006.01)
*B25J 9/10* (2006.01)

(52) U.S. Cl.
CPC ........... *B25J 18/025* (2013.01); *B25J 9/1045* (2013.01)

(58) Field of Classification Search
CPC . B25J 18/025; B25J 9/1045; B25J 1/08; B25J 9/104
See application file for complete search history.

(56) References Cited

U.S. PATENT DOCUMENTS 2,861,699 A * 11/1958 Youmans ................ B25J 13/02 92/132
3,010,328 A 11/1961 Forey (Continued)

FOREIGN PATENT DOCUMENTS

CN 107697631 A 2/2018
EP 1722934 B1 5/2008

(Continued)

OTHER PUBLICATIONS

Extended European Search Report from EP Application No. 24306057.1 search completed Oct. 17, 2024.

*Primary Examiner* — Terence Boes
(74) *Attorney, Agent, or Firm* — Merchant & Gould P.C.

(57) ABSTRACT

Telescopic device of a remote-operation arm, comprising an outer tube that is fixed relative to a mounting joint that forms the shoulder of the arm and defines a proximal end of the telescopic device, an intermediate tube and an inner tube provided at a distal end of the telescopic device with a tool-manipulator device, the intermediate tube sliding in the outer tube and the inner tube sliding in the intermediate tube, the telescopic device comprising a first electric motor secured to one end of the intermediate tube at the end corresponding to the proximal end, said motor being coupled to a drive pinion of a chain conveyor extending through the inner tube towards the distal end, said chain conveyor comprising an outbound portion and a return portion between said drive pinion and a follower pinion at the end corresponding to the distal end, said outbound portion travelling towards said distal end and the return portion travelling towards said proximal end as the telescopic device extends, and wherein the inner tube is secured via a first rod to the outbound portion near said motor while the outer tube is secured to the return portion at the end corresponding to the follower pinion via a second rod extending along the chain conveyor so that when the telescopic device is retracted, rotation of the first electric motor in the direction for extending the telescopic device pushes the outer tube and the inner tube in two opposite directions with respect to the central tube causing the telescopic device to extend, and so that, when the telescopic device has been extended, rotation of the first electric motor in a direction for (Continued)

retracting the telescopic device pulls the outer tube and the inner tube towards one another.

6 Claims, 5 Drawing Sheets

(56) References Cited

U.S. PATENT DOCUMENTS

| | | | | | |
|---|---|---|---|---|---|
| 4,566,843 | A * | 1/1986 | Iwatsuka | G21C 17/00 414/744.1 |
| 5,611,248 | A * | 3/1997 | Peltier | B25J 9/023 74/490.09 |
| 2008/0014051 | A1 | 1/2008 | Garrec et al. | |
| 2015/0003945 | A1 | 1/2015 | Takahashi et al. | |

FOREIGN PATENT DOCUMENTS

| | | | |
|---|---|---|---|
| FR | 1191667 | A | 10/1959 |
| FR | 2530526 | A1 | 1/1984 |
| FR | 2542658 | A1 | 9/1984 |
| FR | 2667532 | A1 | 4/1992 |
| FR | 2935630 | A1 | 3/2010 |
| FR | 2976513 | A1 | 12/2012 |
| JP | 05118399 | A | 5/1993 |
| JP | 05231426 | A | 9/1993 |

* cited by examiner

TELESCOPIC DEVICE FOR A REMOTE-OPERATION MOTORIZED ARM, AND ARM COMPRISING SAME

PRIORITY

This application claims priority to EP patent application Ser. No. 24/306,057.1 filed on Jun. 28, 2024 which is incorporated herein by reference. To the extent appropriate, a claim of priority is made to the above disclosed application.

TECHNICAL FIELD

The invention falls within the domain of remote-operation motorized arms provided with a telescopic gripper device and notably intended for handling irradiated elements for example inside the vessels of nuclear power stations or waste reprocessing centres.

PRIOR ART

Remote-operation devices with slaved motorized telescopic remote manipulator arms comprising manoeuvring systems involving cables running along the outside of tubes of these arms in order to transmit the commands from motors situated at the end of master arms situated in a control centre are known. In one refinement, document FR 2 667 532 A1 converts the remote manipulator arms into manipulator arms by replacing the master arm with a control unit provided with electric motors to action the transmissions via cables and rods in order to control the various parts of the arm: rotary shoulder, telescopic tubes and tool-manipulation-fitting. Examples of manipulator arms provided with a motorized drive system built into the arm and comprising electric motors distributed within the arm both in respect of the shoulder and in respect of the telescopic tubes and the end-fitting are known from documents FR 2 935 630 A1 and FR 2 976 513 A1. With this type of arm, the transmission of movement for the deployment and retraction of a telescopic part of the arm is achieved by means of a power screw device comprising a threaded rod forming the nut element which receives a threaded rod forming the screw, this power screw device being external to the tubes that form said telescopic part of the arm, and connected to an intermediate tube of the arm. This device enables the intermediate tube to be moved with respect to a proximal first tube that is fixed with respect to the shoulder of the arm, while a distal third tube is moved with respect to the intermediate tube by means of a chain-drive device referred to as doubler device. These distributed-drive arms in which the transmission of movement is achieved by mechanical connections referred to as rigid, such as geared connections, pinions, toothed wheels, screws and chains are, unlike elastic connections such as cable transmissions, precise and notably enable the control of movements of the arms to be automated thanks to the repeatability of the positionings achieved in the relative movements of the various parts of the arm.

Technical Problem

While the known distributed-drive solutions do solve the problems of repeatability of the movements, they do not, however, enable the overall cross section of the arms to be reduced so that they can pass through smaller-diameter through-holes in walls with the arm still maintaining a heavy lifting capability, which means that for a given through-hole diameter, for example 15 cm, having the control rod device that controls the telescopic arm device sited external to the arm limits the diameter of the tube to a diameter of around 10 cm or even less, thereby limiting the diameter of the control motor positioned at the end of the arm adjoining the shoulder of the arm.

SUMMARY OF THE INVENTION

In light of this situation, the present disclosure proposes a telescopic device of a remote-operation arm, comprising an outer first tube that is fixed relative to a mounting joint that forms the shoulder of the arm and defines a proximal end of the telescopic device, an intermediate tube and an inner tube provided with a tool-manipulator device that defines a distal end of the telescopic device, the intermediate tube sliding in the first tube and the inner tube sliding in the intermediate tube, characterized in that it comprises a first electric motor secured to one end of the intermediate tube at the end corresponding to the proximal end, said motor being coupled to a drive pinion of a chain conveyor extending through the inner tube towards the distal end, said chain conveyor comprising an outbound portion and a return portion between said drive pinion and a follower pinion at the distal end, said outbound portion travelling towards said distal end as the telescopic device extends, the return portion travelling towards said proximal end as the telescopic device extends, and wherein the inner tube is secured to the outbound portion near said motor while the outer tube is secured to the return portion at the end corresponding to the follower pinion via a first rod extending along the chain conveyor so that when the telescopic device is retracted, rotation of the first electric motor in the direction for extending the telescopic device pushes the outer tube and the inner tube in two opposite directions with respect to a frame of reference associated with the intermediate tube causing the telescopic device to extend, and so that, when the telescopic device has been extended, rotation of the first electric motor in a direction for retracting the telescopic device pulls the outer tube and the inner tube towards one another with respect to the intermediate tube.

The features set forth in the following paragraphs correspond to embodiments that may be implemented independently of one another or in combination with one another.

The first electric motor may be coupled to the drive pinion via pinions that form a reduction gearset.

The chain conveyor may comprise a stiffener and a tensioner between the drive pinion and the follower pinion, The drive pinion and the first electric motor may be mounted on a support secured to the intermediate tube.

The present disclosure also relates to a remote-operation motorized arm provided with a telescopic device according to any one of the preceding claims, wherein the joint is moved by a second electric motor arranged in an upstream part of said shoulder and driving the rotation of the shoulder via a reduction system acting on a toothed sector secured to a downstream part of the shoulder that is rotationally mobile with respect to the upstream part.

The upstream part of the shoulder may comprise a first yoke secured to a wall-penetrating rotary tube.

The outer tube is preferably secured to the shoulder by means of a second yoke forming a downstream part of the shoulder joint.

BRIEF DESCRIPTION OF THE DRAWINGS

Other features, details and advantages of the invention will become apparent on reading the following detailed description of non-limiting example embodiments, and on analysing the appended drawings, in which.

DESCRIPTION OF THE EMBODIMENTS

The drawings and the description below include elements that may not only make the present invention easier to understand, but also contribute to the definition thereof, where appropriate.

Figure 1:
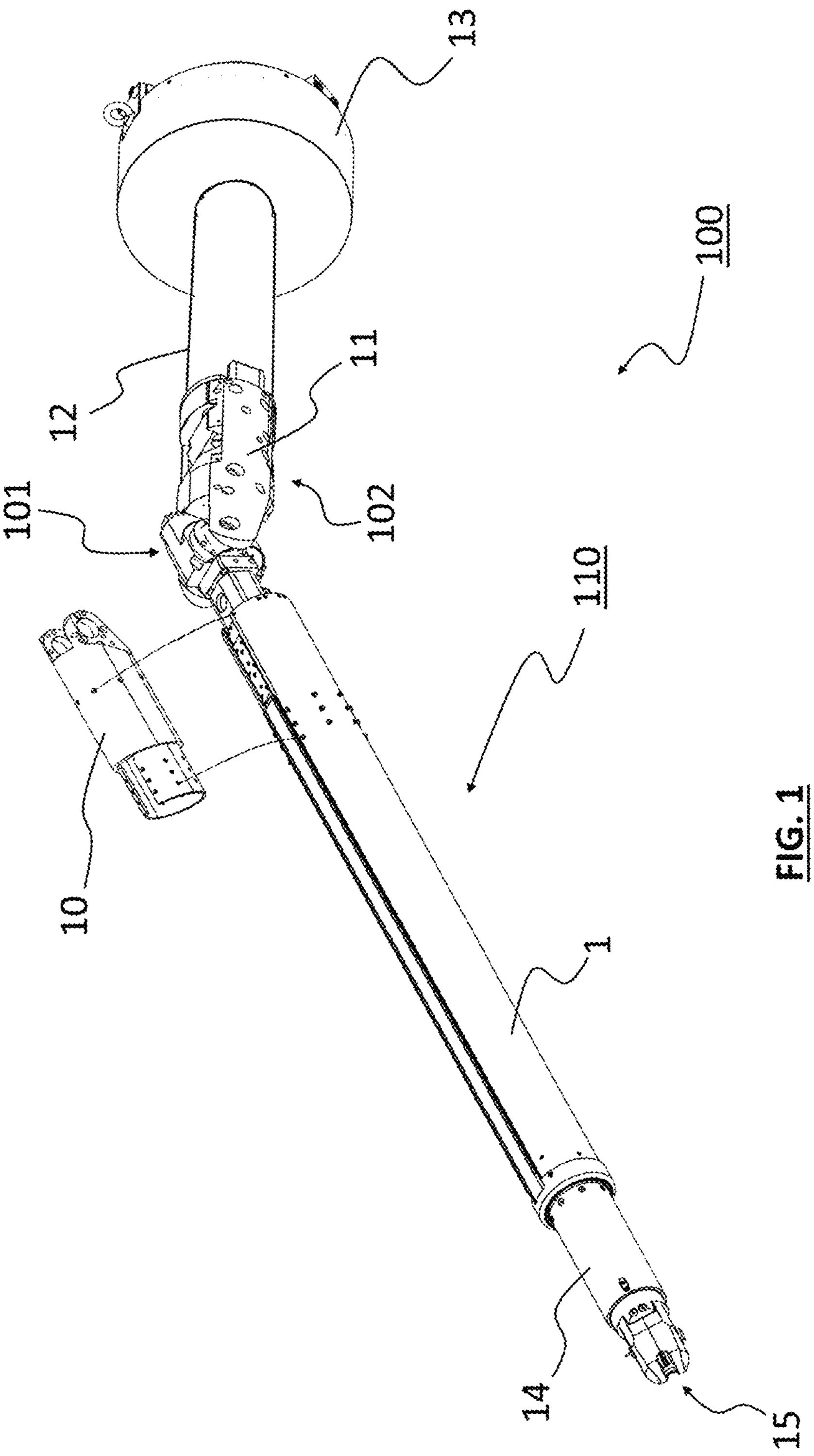
FIG. 1 is an overall view of a remote-operation motorized arm.

Reference is now made to FIG. 1 which depicts a motorized remote-operation arm 100 comprising a body 13 in which there is a motor for the rotational manoeuvring of a wall-penetrating tube 11 in a movement referred to as the X-movement of the arm, of which a proximal end is mounted on the body 13, and connections for electrical cables for controlling electric motors distributed in the arm. At a distal end of the wall-penetrating tube 12 there is a shoulder provided with a joint 101 performing a Y-movement of the arm. The shoulder comprises, on an upstream side, which is the side corresponding to the wall-penetrating tube, a first yoke 11 containing a motor for the rotational manoeuvring of the shoulder and comprises, on the downstream side, a second yoke 10 articulated to the first yoke and supporting a proximal end of a telescopic device 110 which at a distal end comprises a tool-manipulating device 14, the telescope achieving an arm movement referred to as Z-movement.

Figure 2A:
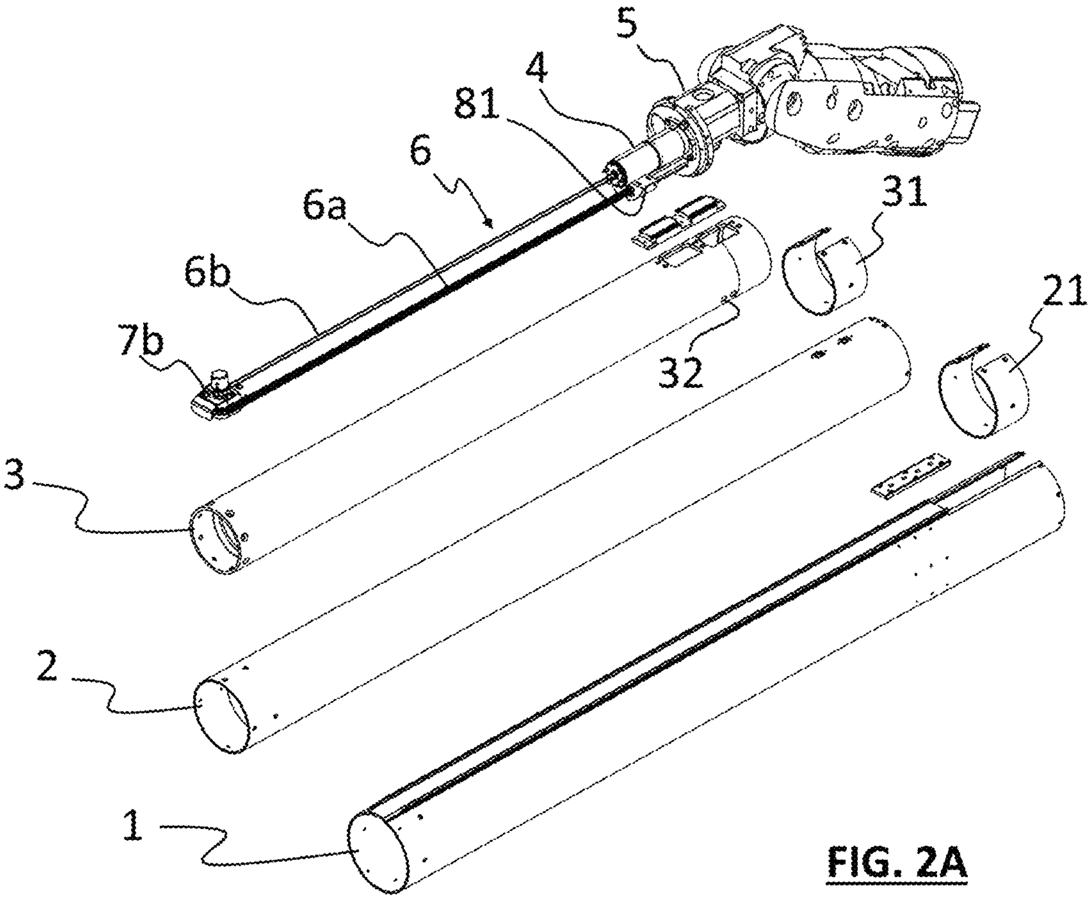
FIG. 2A is an exploded view of a telescopic device of the present disclosure.

The telescopic device 110 of the remote-operation arm 100, more particularly detailed in FIGS. 2A to 4, comprises, according to FIG. 2A, an outer tube 1 that is fixed with respect to the joint 101 that forms the shoulder of the arm and which defines a proximal end of the telescopic device.

Figure 2B:
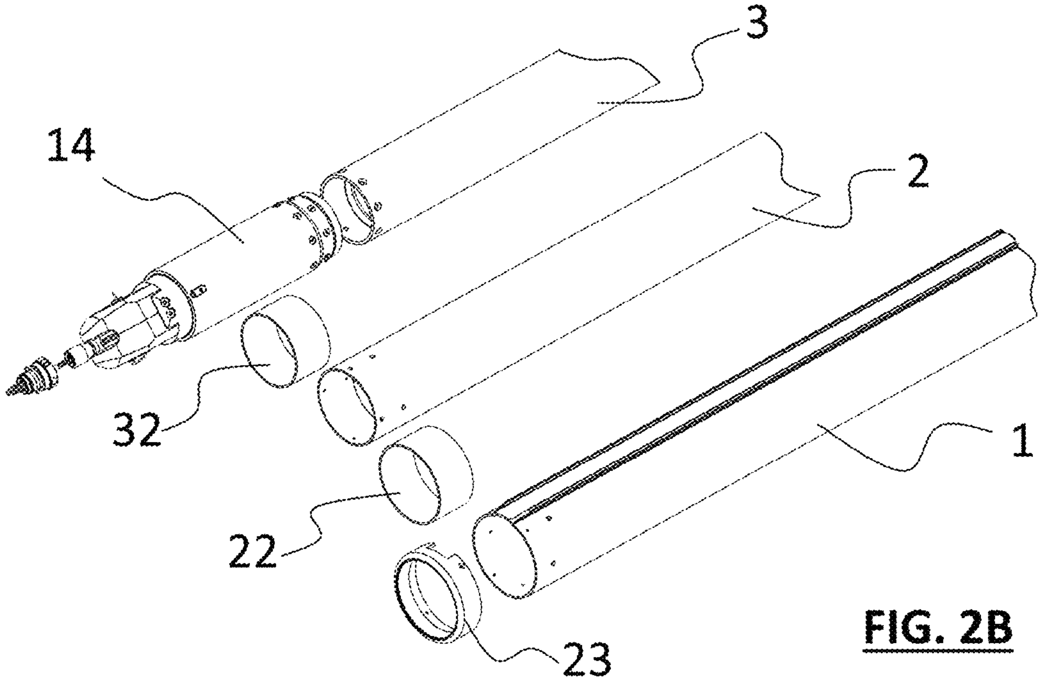
FIG. 2B shows a downstream part of the telescopic device of FIG. 2A.

The telescopic device further comprises an intermediate tube 2 and an inner tube 3 provided at a distal end of the telescopic device with the tool-manipulator device 14, as depicted in FIG. 2B, which is an exploded view of the distal end of the telescopic device.

The intermediate tube 2 slides in the outer tube 1, and the inner tube 3 slides in the intermediate tube 2. Between the tubes, at the end corresponding to the proximal end, there are sliding pads or rings 21, 31. Likewise, between the tubes at the end corresponding to the distal end there are second sliding pads or rings 22, 32 allowing the tubes to slide easily inside one another.

In FIG. 2A, the telescopic device comprises a first electric motor 4 secured to one end of the intermediate tube 2 at the end corresponding to the proximal end. This motor 4 is coupled to a drive pinion 7*a* of a chain conveyor 6 extending through the inner tube towards the distal end. The coupling may be made with motor shaft output gearing driving gearing secured to the drive pinion 7*a*.

The chain 6 of the chain conveyor comprises two portions between the drive pinion 7*a* and a return pinion 7*b* at the end corresponding to the distal-end side, defining an outbound portion 6*a* and a return portion 6*b*, the return portion travelling from the proximal end towards the distal end of the conveyor and the return portion travelling in the opposite direction as the telescopic device extends.

The inner tube 3 is secured to the outbound portion near said motor 4 by means of a fixing device comprising a first fastener 61 on the chain, a first end of a first rod 8 being fixed to the first fastener by screws accommodated in holes 82 in the rod and tapped holes in said first fastener 61, a second end of the first rod comprising a first shoe 81 provided with tapped holes accepting screws that pass through holes in the inner tube 3. The first rod 8 is a short rod connecting the proximal part of the inner tube to the outbound portion of the chain at the end corresponding to the proximal end.

Figure 4:
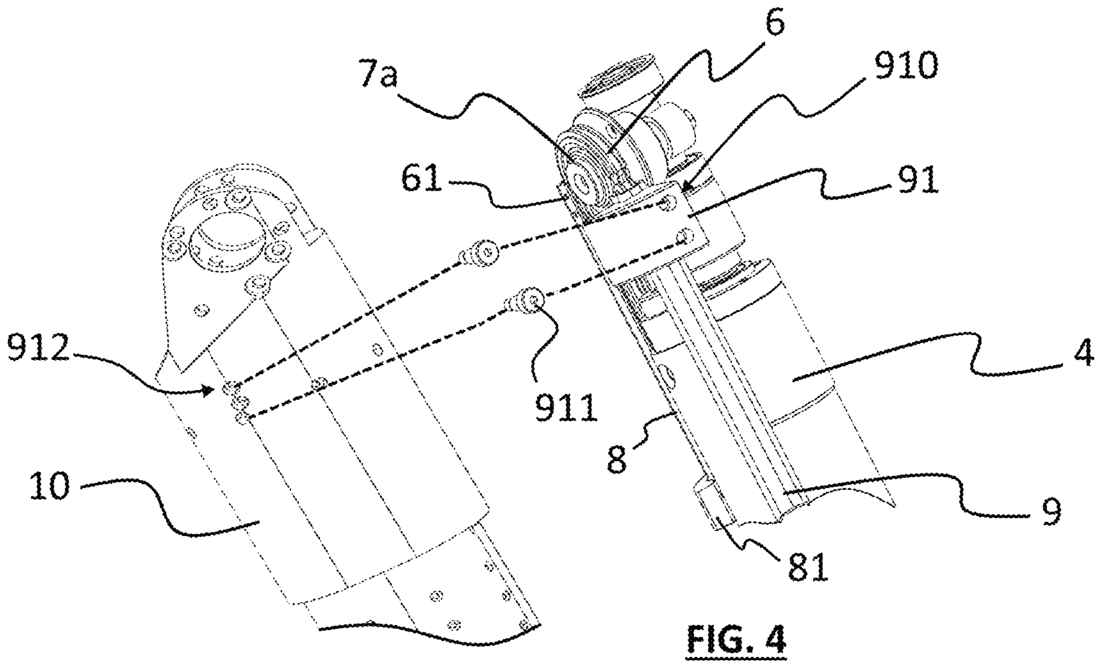
FIG. 4 shows a detail of the fixing of an outer tube to a connecting rod on the chain conveyor.

The outer tube 1 for its part is secured to the return portion at the end corresponding to the follower pinion 7*b* via a second rod 9 that is fixed to a second fastener 62 on the chain at the end corresponding to the follower pinion 7*b* and which extends along the chain conveyor from the distal end of said conveyor towards its proximal end corresponding to the motor where it is fixed to the outer tube by means of a second shoe 91 provided with tapped holes 910 accepting screws 911 that pass through holes 912 in the second yoke 10 to which the proximal end of the outer tube is fixed as depicted in FIG. 4.

A first direction of rotation of the motor 4 defines an extension of the telescopic device and when the drive pinion 7*a* rotates in this direction of rotation under the action of the motor 4, the outbound portion 6*a* travels towards said distal end and the return portion 6*b* travels towards said proximal end.

Taking the second yoke 10 to constitute a fixed point, with the telescopic device retracted, a rotation of the first electric motor 4 in the direction for extending the telescopic device pushes the entity comprising the intermediate tube, the motor, the chain conveyor and the central tube in the direction of extension. In other words, considering a frame of reference associated with the intermediate tube 2, the outer tube 1 and the inner tube 3 are pushed into opposing directions with respect to this intermediate tube 2 by the opposing movements of the portions 6*a*, 6*b* of the chain 6, thus causing the telescopic device to extend.

Likewise, with the telescopic device extended, a rotation of the first electric motor 4 in the direction for retracting the telescopic device pulls the outer tube 1 and inner tube 3 towards one another relative to the intermediate tube 2, thus causing the telescopic device to retract.

Figure 3:
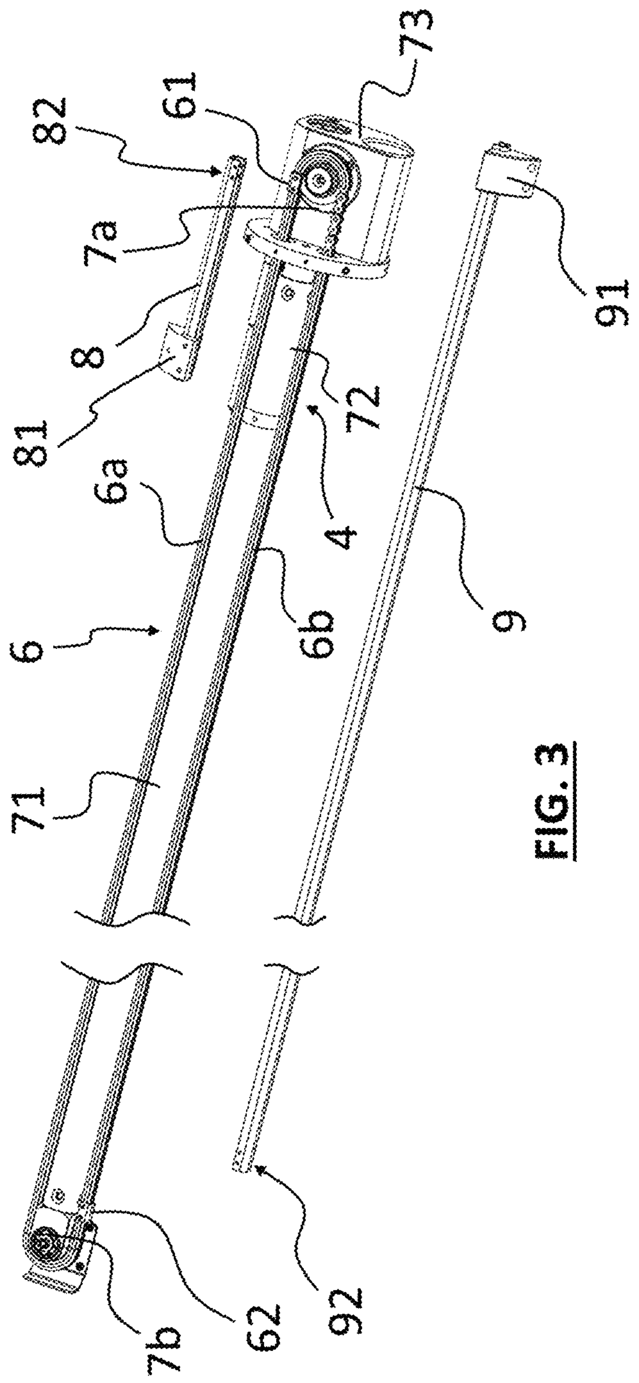
FIG. 3 shows a chain conveyor of the device of FIG. 2.

As depicted in FIG. 3, the chain conveyor comprises a stiffener 71 and a tensioner 72 between the drive pinion 7*a* and the follower pinion 7*b* so as to keep the chain taut. The chain conveyor thus constitutes a mechanical connection that can be qualified as rigid between the drive pinion and the follower pinion, thereby ensuring good repeatability of the extension/retraction movements of the telescopic device, unlike cable-driven devices, and high precision of these movements.

Still according to FIG. 3, the drive pinion 7*a* and the first electric motor 4 are mounted on a support 73 secured to the intermediate tube 2 and that is inserted and screwed into the latter.

Figure 5:
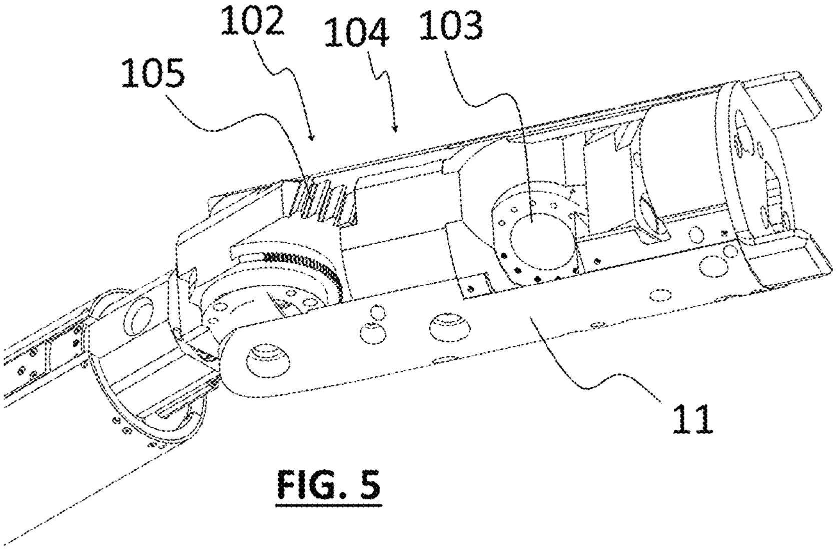
FIG. 5 shows a downstream part of the shoulder of the arm of FIG. 1.

The joint 101 depicted notably in FIG. 5 is moved by a second electric motor 103 referred to as the Y-movement shoulder motor arranged in an upstream part 102 of said shoulder and driving the rotation of the shoulder through a reduction system 104 acting on a toothed sector 105 secured to the second yoke 10 in the downstream part of the shoulder that is rotationally mobile with respect to the first yoke 11 in the upstream part 102 of the shoulder secured to the wall-penetrating rotary tube 12.

The invention is not restricted to the examples described hereinabove merely by way of example but encompasses all variants that a person skilled in the art may be able to envision that fall within the scope of the protection that is sought, and notably the tool-manipulator device 14 may have a motorized wrist 15 articulated about two or three axes, provided with an end fitting for holding a tool or any other device traditionally used in that field, such as a gripper.

The invention claimed is:

1. Telescopic device of a remote-operation arm, comprising an outer tube that is fixed relative to a mounting joint that forms the shoulder of the arm and defines a proximal end of the telescopic device, an intermediate tube and an inner tube provided at a distal end of the telescopic device with a tool-manipulator device, the intermediate tube sliding in the outer tube and the inner tube sliding in the intermediate tube, further comprising a first electric motor secured to one end of the intermediate tube at its proximal end side, said motor being coupled to a drive pinion of a chain conveyor extending through the inner tube towards the distal end, said chain conveyor comprising an outbound portion and a return portion between said drive pinion and a follower pinion at the distal end side, said outbound portion travelling towards said distal end and the return portion travelling towards said proximal end as the telescopic device extends, and wherein the inner tube is secured via a first rod to the outbound portion near said motor while the outer tube is secured to the return portion at the end corresponding to the follower pinion via a second rod extending along the chain conveyor so that when the telescopic device is retracted, rotation of the first electric motor in the direction for extending the telescopic device pushes the outer tube and the inner tube in two opposite directions with respect to a frame of reference associated with the intermediate tube causing the telescopic device to extend, and so that, when the telescopic device has been extended, rotation of the first electric motor and in a direction for retracting the telescopic device pulls the outer tube and the inner tube towards one another.

2. Telescopic device according to claim 1, wherein the chain conveyor comprises a stiffener and a tensioner between the drive pinion and the follower pinion.

3. Telescopic device according to claim 1, wherein the drive pinion and the first electric motor are mounted on a support secured to the intermediate tube.

4. Remote-operation motorized arm provided with a telescopic device according to claim 1, wherein the joint is moved by a second electric motor arranged in an upstream part of said shoulder and driving the rotation of the shoulder via a reduction system acting on a toothed sector secured to a downstream part of the shoulder that is rotationally mobile with respect to the upstream part.

5. Remote-operation motorized arm according to claim 4, wherein the upstream part of the shoulder comprises a first yoke secured to a wall-penetrating rotary tube.

6. Remote-operation motorized arm according to claim 4, wherein the outer tube is secured to the shoulder by means of a second yoke forming a downstream part of the shoulder joint.

* * * * *